(12) United States Patent
Gemme et al.

(10) Patent No.: US 7,813,818 B2
(45) Date of Patent: Oct. 12, 2010

(54) MEDIUM VOLTAGE INTEGRATED SWITCHGEAR

(75) Inventors: Carlo Gemme, Pavia (IT); Paolo Gritti, Albano Sant' Alessandro (IT); Alessandro Colombo, Milan (IT); Christian Reuber, Ratingen (DE); Pentti Mahonen, Wasa (FI); Marty Trivette, Cary, NC (US)

(73) Assignee: ABB Technology AG, Zurich (CH)

( * ) Notice: Subject to any disclaimer, the term of this patent is extended or adjusted under 35 U.S.C. 154(b) by 1750 days.

(21) Appl. No.: 10/876,663

(22) Filed: Jun. 28, 2004

(65) Prior Publication Data

US 2005/0001489 A1 Jan. 6, 2005

Related U.S. Application Data

(63) Continuation of application No. PCT/EP02/14892, filed on Dec. 27, 2002.

(51) Int. Cl.
G05B 11/01 (2006.01)
G01R 19/00 (2006.01)
H02B 1/24 (2006.01)

(52) U.S. Cl. ............... 700/22; 700/286; 702/64; 702/182; 307/112

(58) Field of Classification Search .............. 700/22, 700/286; 361/368; 307/38–42, 112, 125–131; 702/62, 64, 182

See application file for complete search history.

(56) References Cited

U.S. PATENT DOCUMENTS 6,347,027 B1 * 2/2002 Nelson et al. ............ 361/64

FOREIGN PATENT DOCUMENTS

WO WO 0048283 8/2000

OTHER PUBLICATIONS

Hossenlopp, Luc et al. "Increasing Availability of GIS Installation by Using Digital Control, Protection and Monitoring Systems." CEPSI 2000. Retrieved from the Internet: <URL: http://www.energythai.net/cepsi2000/T1035.pdf>. XP-002242703.

(Continued)

*Primary Examiner*—Paul L Rodriguez
*Assistant Examiner*—Sheela Rao
(74) *Attorney, Agent, or Firm*—Connolly Bove Lodge & Hutz LLP; Arlene P. Neal (57) ABSTRACT

An electric power distribution switchboard (1) in which one or more functional units are equipped with a switching device compartment (3) that integrates primary and secondary functions. Within the switching device compartment (3) are included, together with the switching device (37), the current and voltage sensors (36), the position sensors for interlocking, a human machine interface (HMI) and an Intelligent Electronic Device (IED) (4) and the related local configuration point (32) to configure the IED (4). The IED (4) realizes functional unit supervision, control, protection, communication and monitoring and acts as a concentrating point of functional unit information and decisions. The switchboard (1) of the invention further comprises power supply section, an I/O section and a communication system.

7 Claims, 7 Drawing Sheets

OTHER PUBLICATIONS

Anonymous. "Future trends in MV switchgear." Vector Electrical Engineering. pp. 20, 22-23. Pulse Publishing Ltd. Johannesburg, South Africa. Apr. 1998. XP009011167.

Sezi, Tevfik et al. "New Intelligent Electronic Devices Change the Structure of Power Distribution Systems." Conference Record of the 1999 IEEE Industry Applications Conference. Phoenix, AZ. vol. 2. pp. 944-952. Oct. 3-7, 1999. XP001016694.

Katschinski, U. et al. "A New Generation of Control and Diagnostic Techniques for Gas Insulated Switchgear." Proceeding of International Confrence on Energy Management & Power Delivery. Singapore. IEEE Catalogue No. 98EX137. vol. 2. pp. 607-612. Mar. 3-5, 1998. XP010293728.

* cited by examiner

MEDIUM VOLTAGE INTEGRATED SWITCHGEAR

CROSS-REFERENCE TO RELATED APPLICATION

This application is a U.S. Continuation of co-pending International Patent Application No. PCT/EP02/14892, filed on Dec. 27, 2002 by Gemme, Carlo et al. entitled A MEDIUM VOLTAGE INTEGRATED SWITCHGEAR, the entire contents of which is incorporated by reference. As in the parent International Application No. PCT/EP02/14892, priority is also claimed to co-pending European Patent Application No. EP 01205248.6, filed on Dec. 28, 2001, the entire contents of which is incorporated by reference for which priority is claimed under 35 U.S.C. §119.

BACKGROUND OF THE INVENTION

The present invention relates to a Medium Voltage distribution switchboard, having a high level of integration of functionalities.

In the present electrical energy distribution system architecture, the electrical switchboard acts as a node, while the cable and overhead lines represent the conjunction of the various nodes.

According to this scheme, within the switchboard are concentrated all the required system management functions that have to be dealt with for electrical energy distribution. These functions are historically divided into two different types, primary and secondary functions.

Primary functions are called all functions related to the main voltage, current and power distribution, while secondary functions are called all functions related to auxiliary and control features.

Some examples of primary functions are:

making, breaking, conduct the nominal current, withstand the short circuit current for a certain time, disconnection, earthing, connections and disconnections of cable for substitution or test, isolation of live part from operators.

Some secondary functions are: protection, interlocking, supervision (local or remote), control (local or remote), automation, measure, metering, diagnostic, communication.

All these functions are provided by means of switchboards composed of several functional units.

The different functions are subdivided among different components within the functional units of the switchboard, usually in the following way:
- one or more metal enclosures are used to contain and confine the electrical equipment, isolating it from the operator, allowing in this way safe operation;
- the switching units allow some of the primary functions like making, breaking and disconnections; in several occasions more than one switching or earthing unit is necessary per functional unit;
- the Switchboard Control Unit (SCU) integrates many of the secondary functions, like measure, protection, control and communication;
- Current and Voltage Transformers (CT, VT) are placed in a convenient position on the switchboard, taking into account that their size is usually relevant.

All the above mentioned components are manufactured in a very industrialised way, with standard characteristic and properties demonstrated by specific performed type tests.

A number of further electrical and mechanical components are required in order to complete the switchboard, as shutters, contacts, busbars, withdrawable plugs, etc.

A large part of these components realize secondary functions: they are connected through a bundle of wires (intra-panel vertical cabling within the functional unit) and another bundle of wires connects each functional unit with the others of the same switchboard (inter-panel horizontal cabling within the switchboard).

Figure 2A:
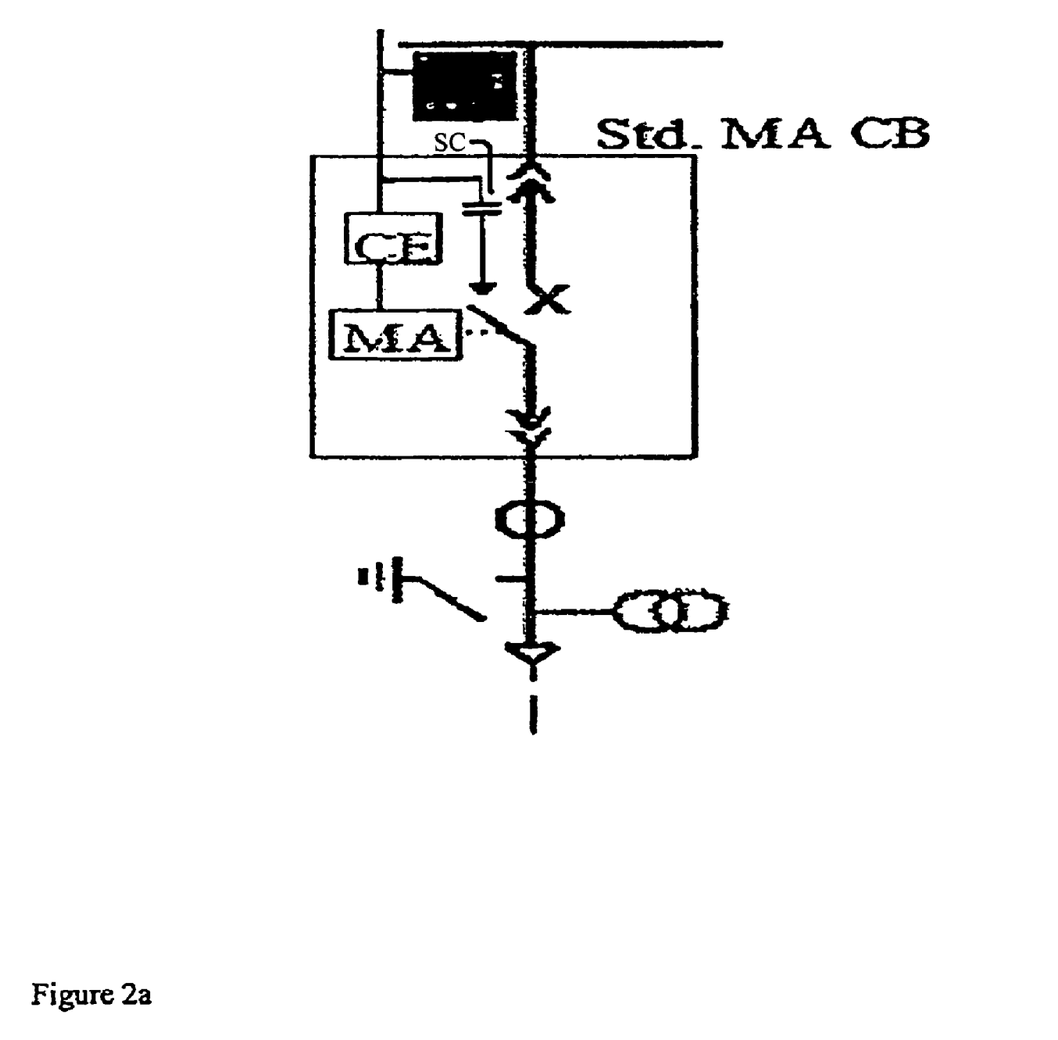
FIG. 2a illustrates a single line diagram.
Figure 2B:
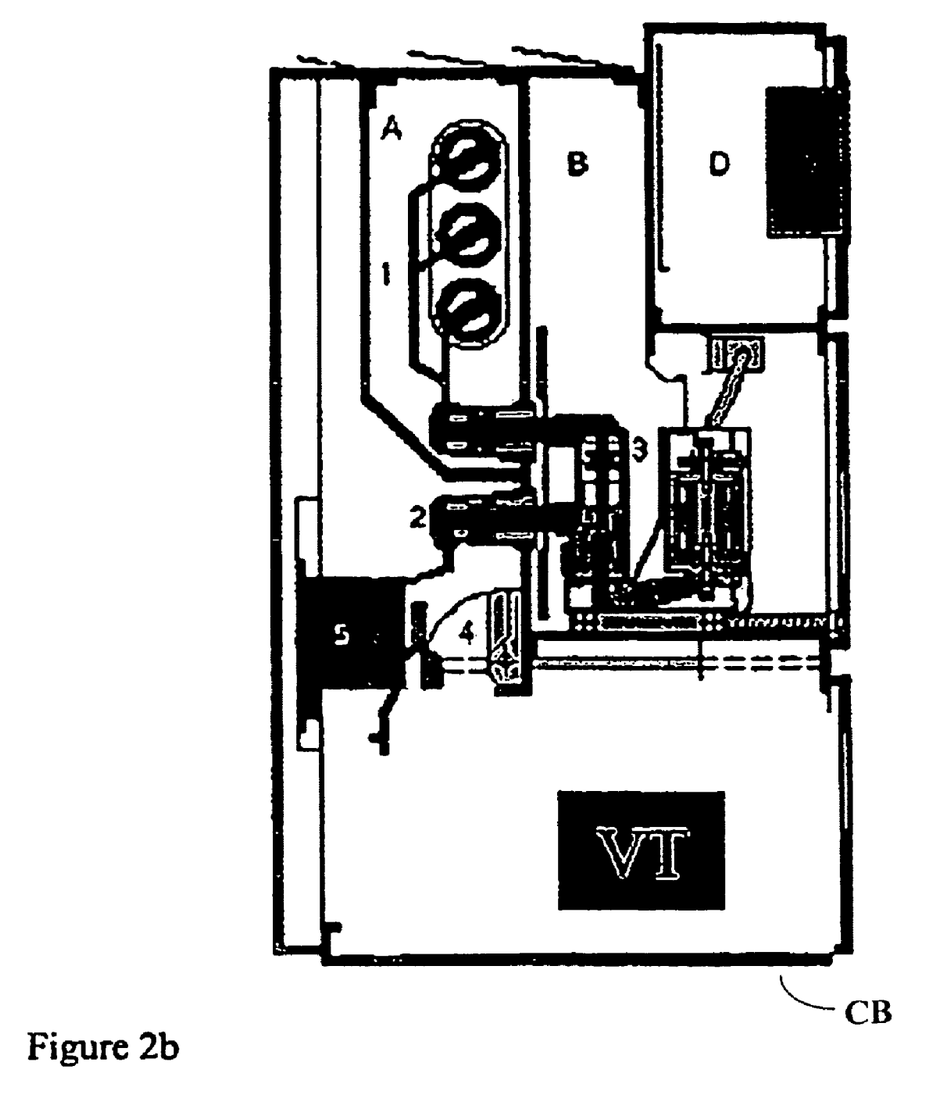
FIG. 2b illustrates a primary distribution single panel.

Present solution in primary distribution single panel is reported in FIG. 2b, with relevant single line diagram in FIG. 2a. In FIG. 2b a withdrawable CB can be spring operated or magnetically actuated; in the second case (FIG. 2a) a control electronic (CE) and an energy storage capacitor (SC) is integrated on-board to control and supply the magnetic actuator (MA).

Voltage measure is an optional feature (in grey in FIG. 2a), usually required for busbar voltage measure in bus-tie CB and in incoming feeders.

Spreading the different functions among different components leads to a simplification in the objects themselves, but makes the system as a whole much more complex. This leads to wide space occupation and high costs, due to the presence of a lot of components, required cabling and wiring, and the necessity to develop an ad hoc design, at least for the secondary technique part, of the functional unit for each specific customer application.

In present solutions there are functional units including a switching device controlled by an Intelligent Electronic Device (IED), but such IED is only devoted to the switching device control and command and has no access to other information coming from other parts of the functional unit, for example the primary current and voltage values. Moreover in present solutions this IED is not committed to perform monitoring, control and protection functions that usually are assigned to a (functional unit) protection and control unit positioned in a separate compartment, i.e. the low voltage compartment. In this case the functional unit contains two separate IEDs that have to communicate and coordinate each other, for example remote operation commands arrive at the protection unit that has to re-send them to the switching device controller unit; this implies an added complexity and cost due to duplication of intelligence to perform functionalities that could be designed to be concentrated in a unique IED avoiding any problem of co-ordination and communication.

SUMMARY OF THE INVENTION

The invention has the goal to provide a medium voltage switchboard 1 equipped with functional units 2 each of those including a switching device compartment 3 that integrates all functionalities that in present solutions are spread in different parts of the functional unit.

In accordance with the present invention, the switching device compartment 3 is provided with an intelligent electronic device 4 able to control the switching device 37 and the whole functional unit, and acting as a concentrating point of all information related to the functional unit and coming from its different parts. Referring to present solutions where two electronic devices are in the same functional unit, the added complexity and cost due to duplication of intelligence is avoided in the switchboard of the present invention, since the same functionalities are designed to be concentrated in a unique IED avoiding any problem of co-ordination and communication.

Voltage and current sensors 36 are also integrated into the switching device and this solution allows, together with the rest of the invention, to provide a complete system, eliminating the problem of choosing and installing the measure instruments suitable to the rated current and voltage required by the specific application. This means that standard devices can be used, covering with the same hardware the full required range.

The resulting object, that is the switching device and its integrated functionalities, can be designed in an optimised way to be more compact than present solutions, i.e. compared to the switching device compartment plus other device, sensors, cabling presently spread within the functional unit. Compactness and therefore space saving is perceived by the user as an advantage, in fact compact switchboards usually have higher price than the others.

DETAILED DESCRIPTION

As for the design of the switchboard, presently any application requires a specific design of switchboard functional units and an ad hoc realization. This includes a lot of customization work, such as for example, cabling auxiliary contacts to terminal blocks, installing and cabling measuring devices, cabling all inputs and outputs to functional unit, protection and control unit, cabling contact position sensors, e.g. for interlocks, to required terminal blocks or relays.

With the integrated switching device compartment much of the cabling activity is executed only once at production site. For example, interlock position sensors 34 are cabled to IED 4; measuring devices 36 are installed and connected to IED 4; functional unit terminal block 22, if present, or other sensors 50, such as for example temperature or gas pressure sensors, are connected to the process communication system 101.

This means that a considerable part of engineering and commissioning activity, required with present solutions to realize a switchboard for customer application, are saved with this integrated switching device and this leads to a significant cost reduction. Moreover the integrated solution allows to have a standard product that can exploit all scale economies that come from industrial production, allowing a further cost reduction.

The communication system can transfer all information gathered and elaborated by the IED. Configuration of information to be sent on the communication system and of the different IED functions, such as for example protection, control, monitoring functions, is realized with a computer through the local configuration point 32 or through the station communication system 13. Specific functional requirements of the application can be met by this configuration, therefore in a way that is more simple to realize, to correct and to modify in respect to the present cabling and wiring work required. This aspect of the invention presents the advantage of reducing design and commissioning time.

The switchboard according to the present invention is described in details in the block diagrams of FIG. 1 and FIGS. 3 to 6. With reference to said figure the switchboard 1 comprises at least a functional unit (panel) 2, a switching device compartment 3, and an electronic device 4 of intelligent nature. Block 10 represents an auxiliary supply unit. Other possible alternatives are represented by self-supply units which can be concentrated at switchboard level 11 or distributed at switching compartment level 12. Communication lines 100 and 101 allow communication with other intelligent electronic devices 15 and between the intelligent device 4 and a station operator computer 13 and/or with a Human Machine Interface 14 at switchboard level. Other input 50 are also possible. At functional unit level, block 21 represents the lock actuators function and 22 is the panel/switchboard terminal block. At switching device compartment level 3, block 32 represent the local configuration point functionality, 35 is the input from voltage/current sensors, 36 represents the voltage/current sensors, 33 are other sensors input, 34 is the interlock input within the panel, 37 is the circuit breaker or switching device and 38 is the actuator for said circuit breaker or switching device 37. At intelligent electronic device level 4, block 41 represents the control unit, 42 is the power supply functionality, 43 is the power supply functionality for the actuators 38, block 44 represents the communication functions, block 45 is the Human Machine Interface at switching device compartment level, 46 is the I/O function.

Figure 1:
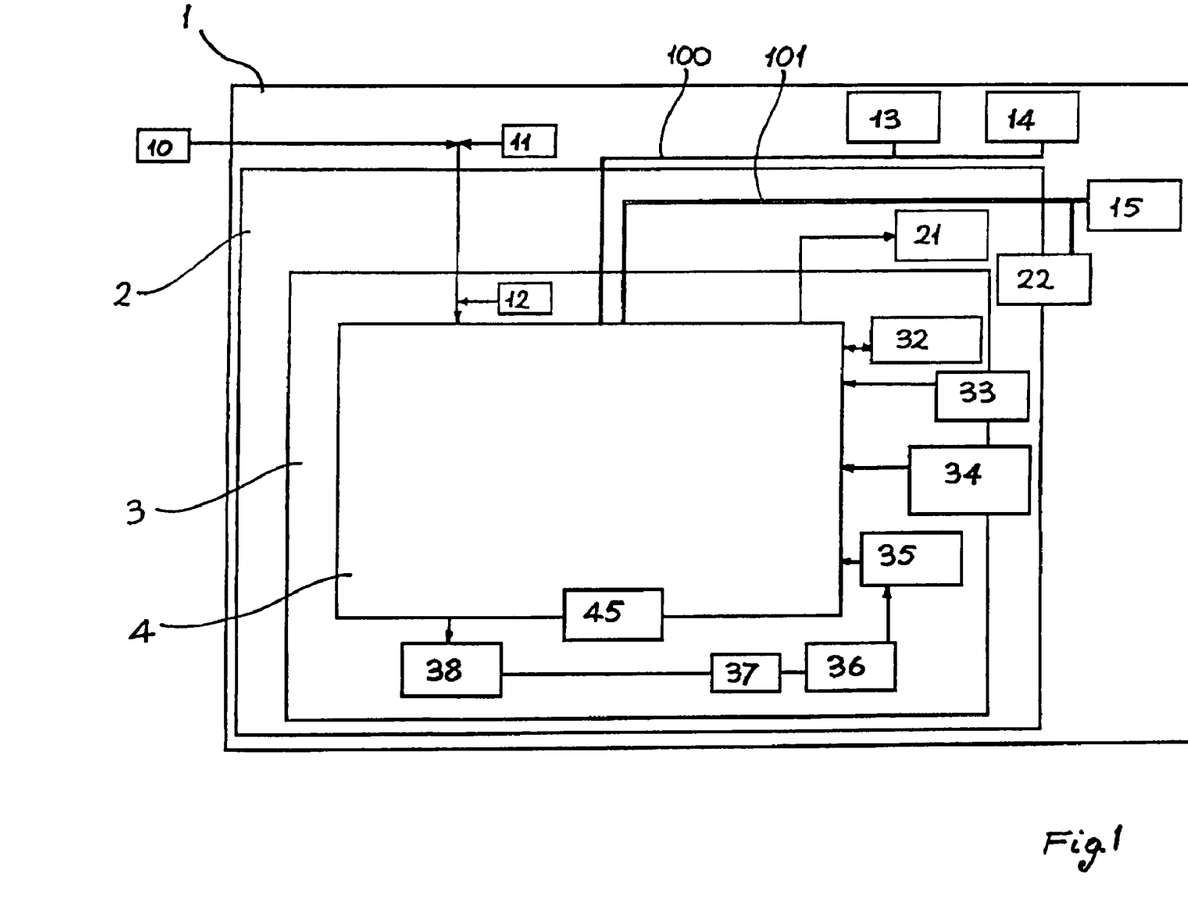
FIG. 1 illustrates an exemplary block diagram of the present invention.

The switchboard according to the present invention comprises, as shown in FIG. 1, one or more functional units 2 which include a switching device 3 compartment that comprises a switching device 37, a switching device actuator 38, a local configuration point 32, a local communication channel, voltage and current sensors 37, position sensors generating interlock information 34 and an Intelligent Electronic Device 4 (IED). One or more terminal blocks 22 are present in the named switchboard.

The IED comprises a control unit 41, a I/O functional block 46, a communication functional block 44, a Human Machine Interface 45, a power supply block 42 and a switching device power drive block 43.

A process communication system 101 extends across the functional unit and links all functional units able to connect to the communication system implemented.

A station communication system 100 can be added and is supported by the IED communication block 44 that extends across the functional units and connect to a station level operator/supervisor workstation or computer 13. In this way the switchboard can have an interface to a higher control level, represented by the station operator computer, and can have a switchboard level Human Machine Interface 14.

The switchboard is equipped with an external auxiliary supply 10; a self supply system internal to the switchboard 11, 12 can be added to act as backup of the auxiliary supply.

The resulting switchboard is depicted in FIG. 1. The whole system in FIG. 1 is separated in different components that are singly described in the following. The main components of the integrated switchboard of the invention are: an Intelligent Electronic Device 4; a Power Supply section; an I/O section; a Communication section.

Figure 3:
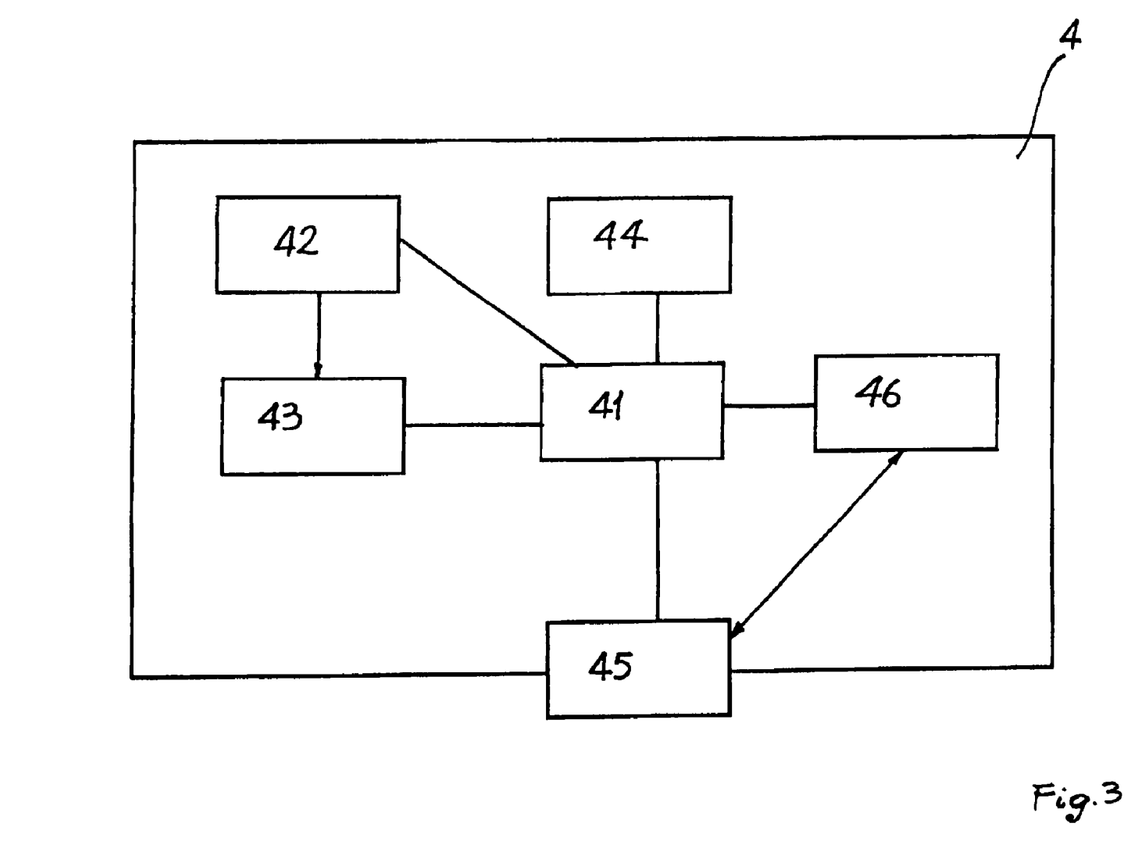
FIG. 3 illustrates an exemplary block diagram of an Intelligent Electronic Device of the present invention.

The intelligent electronic device (IED) is one of the core objects of the invention. It is devoted to the monitoring, protection and control of the whole functional unit, as well as to collect, concentrate and manage all information from different parts of the functional unit. It is physically located within the switching device compartment on-board the switching device itself. With reference to FIG. 3, the IED preferably comprises a control unit which is described in details hereinafter.

The control unit is an electronic block composed by specific hardware, for example permanent and volatile memory, registers, and software that realizes a series of different functions related to the functional unit. The control unit in particular realizes the control of all operating functions and components of the functional unit, such as, for example:

the primary circuit operating and switching; the monitoring, interlocking and operating of the disconnection function, of the earthing function, and in general, of all locking devices; the implementation of safety procedures and operation procedures.

The control unit realizes also the protection of the circuit according to the specific application through implementation of protection functions. Protection functions are realized by the control unit through elaboration, according to predefined algorithms, of information received from input coming for example from voltage and current sensors and possibly other sensors, for example gas pressure sensors.

The control unit is connected to the switching device and has the task of managing operation commands based on required logic, i.e. specific to the application and to the switching device type.

The control unit can manage operation and control of other disconnectors or switches present in the functional unit, for example the earthing switching device, based on required logic.

The control unit realizes interlock functions based on elaboration of information received from input within the functional unit and/or from information of other IED's received through the communication system. Interlock functions can be relevant to the single functional unit or can realize an inter-functional unit interlock logic's.

The control unit is designed to be configured, through parameters setting, as concerns the majority of its functions, for example protection, interlock, switching device control, communication, according to configuration information received from the user PC by means of the local configuration point or, when it is present, from the supervisor station level workstation connected to the station communication system.

The control unit realizes monitoring and diagnostic functions through information received from the switching devices and from the actuator chain and can recorder faults and events, for example number of switching operations, according to the specific application.

The control unit can realize self-check of its own functionality and functional supervision.

Figure 4:
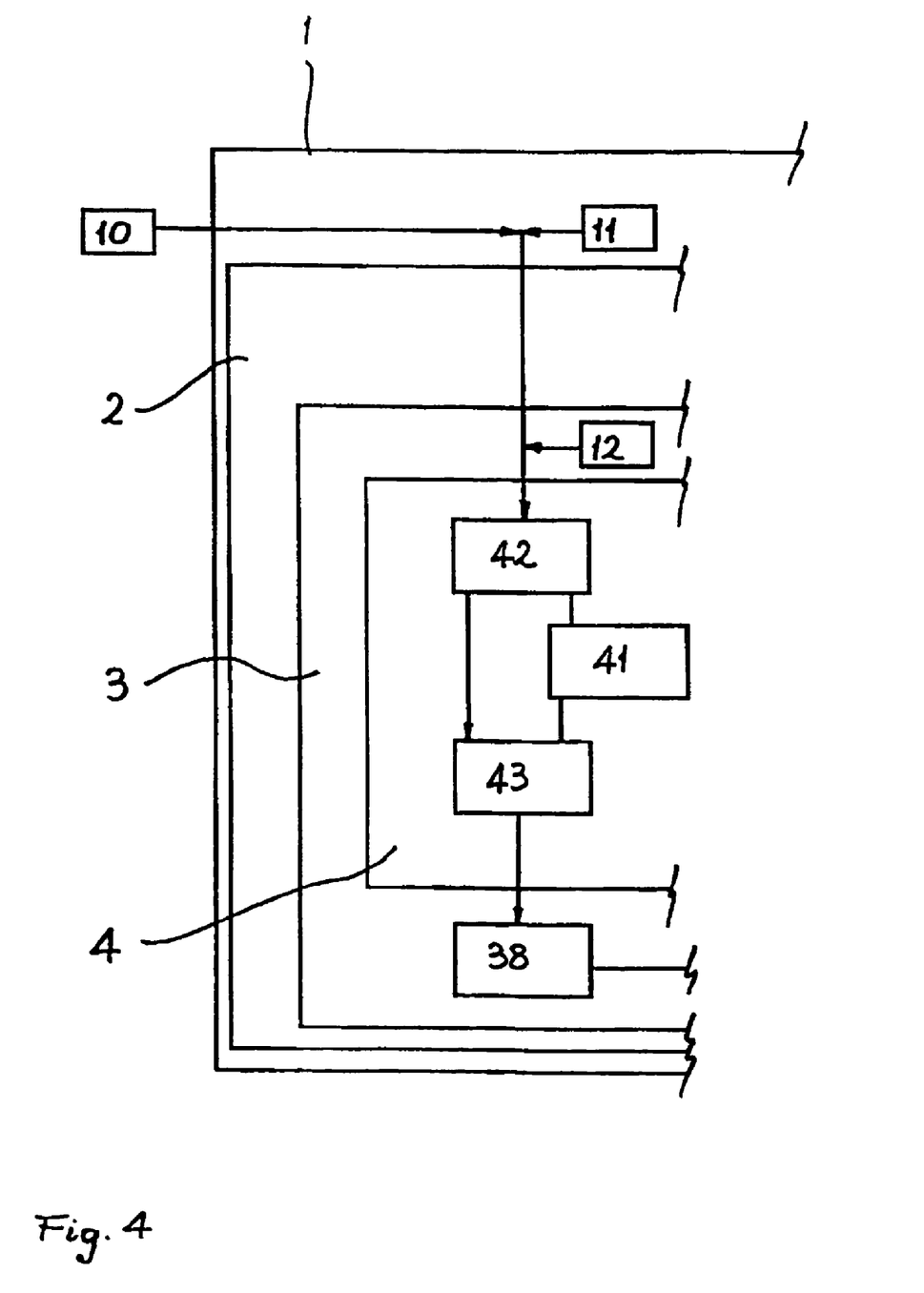
FIG. 4 illustrates an exemplary block diagram of the Power Supply section of the present invention.

With reference to FIG. 4, the Power Supply section highlights the chain that allows the power supply provided by the auxiliary supply, and/or by the self supply, to be exploited by the functional unit for secondary and primary functions, for example the switching device control and protection, the IED functioning and all other accessories. The auxiliary supply is an external supply circuit located, in current solutions, outside the switchboard, that provides the electrical power required for switching device operation, control protection and for all other electrically supplied accessories.

A self supply system, which takes the energy within the system form the primary circuit, can be present and act as a backup of the auxiliary supply. When present, the self supply function is located within the switchboard, integrated in a functional unit (concentrated self supply in a panel dedicated for this function) or within each switching device (distributed self supply), draining the power from the MV busbar, and provides higher reliability to auxiliary supply, or possibly, acts as the only supply source in system where an auxiliary supply is not available. The ED requires a high available and almost un-interruptable source of supply.

The auxiliary supply is connected to the power supply IED block, that is a typical block usually present in any electronic device which realizes the conditioning and adaptation of the power supply to the electronic device, i.e. the control unit and through it to any part of IED, and to the switching device power drive supply block.

The switching device power drive supply is the block within the IED that manage the energy supply to the switching device actuator, modulating the power supply according to the specific actuator requirements and to the required operation and therefore controlling the switching device actuator. It manages also charging/recharging of the energy storage of the switching device, that is always present in current solutions and necessary to enable the required operation sequences, for example O-C-O (opening/closing/opening) operation sequence.

The switching device actuator block represents the mechanical or magnetic actuator system connected by means of a kinematic chain to the switching device electric contacts, together with the mechanical or electrical energy storage (required for the actuator to operate).

Figure 5:
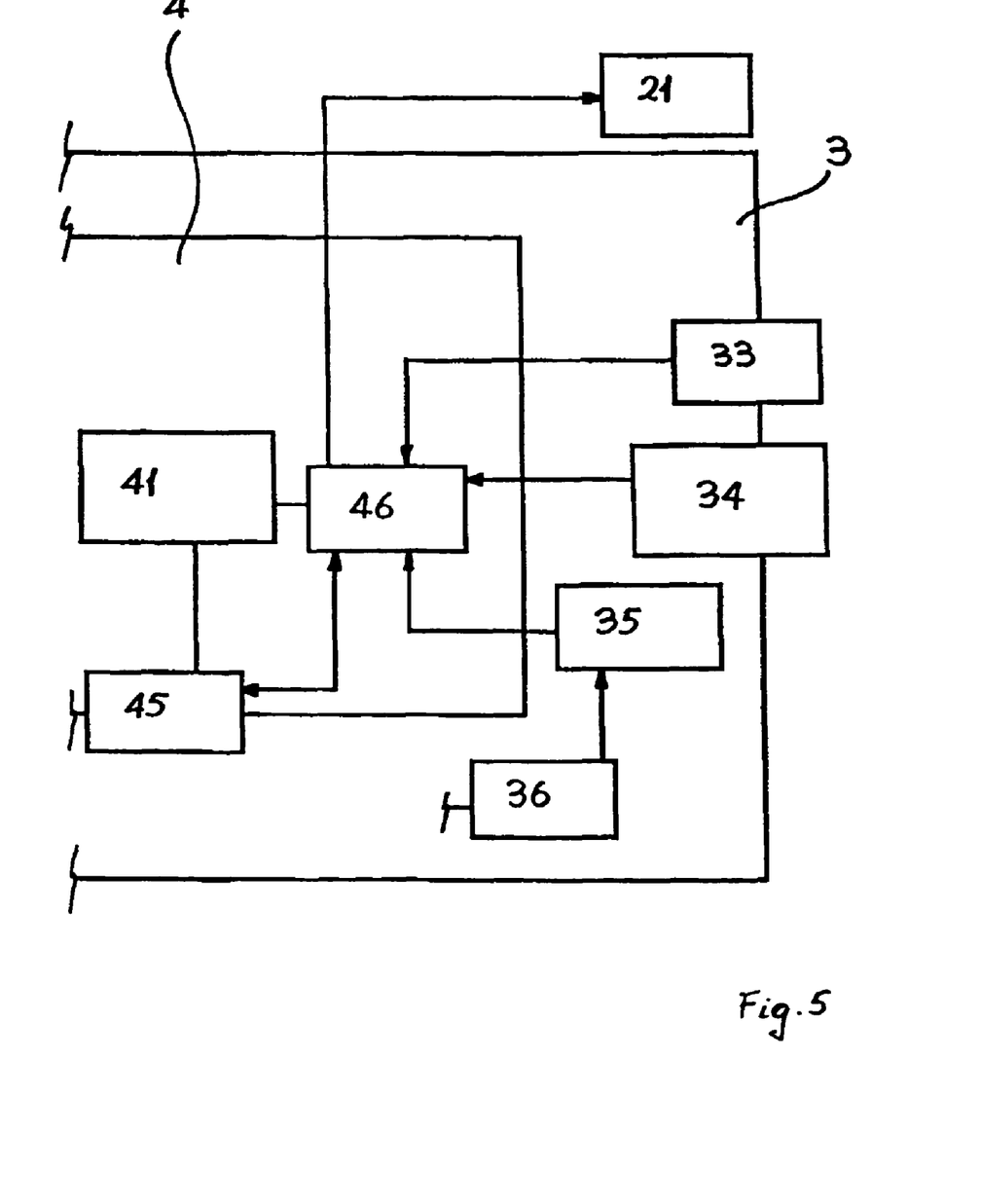
FIG. 5 illustrates an exemplary block diagram of the Input/Output section of the present invention.

The I/O (Input/Output) section, represented in FIG. 5, highlights how all functional unit information and signals are concentrated to the IED. The I/O IED block realizes analog to digital and digital to analog conversion and signal conditioning. Input signals received are then passed to the control unit that elaborates it. Output signals are generated based on information received by the control unit. Inputs arriving to this block can be produced both within or outside the switching device compartment and the same holds for outputs.

Voltage and current sensors are a part of this section and are integrated on-board the switching device. Integration of voltage and current sensors is possible since standard devices covering the full required sensing range are used. The sensors can be a separated part added on the switching device or possibly integrated in the poles, for example in the casting. They provides signals representative of primary current and voltage to be used for measure and protection.

Input from voltage (V) and current (I) sensors represent the signals provided by the V and I sensors and made available to the I/O block.

Interlock input within the functional unit are signals connected, from example hardwired, from several position/status sensors and include the signals of switching device position (open/close), of earth switching device status (open/close), of disconnector status (open/close), of interlock contacts (switching device compartment door position and possibly others).

The lock actuators physically realize mechanical blocks based on interlock signals they receive from the I/O IED block, which transmit it according to control unit signals (from interlocking functionality). The blocks are necessary to ensure safety requirements for the human operators that access the functional unit, for example for maintenance or testing purpose. Different lock actuators can be located inside or outside the switching device compartment.

The HMI (Human Machine Interface) is logically and physically (by wires, possibly with a mobile connector in case that the switching device is withdrawable) connected with the IED and is located on the switching device compartment cover, for this reason it is represented in the figure on the IED border. It allows for example to a human operator to obtain information on the functional unit status, on the network quantities (voltage, current) and to operate the switching device. Information provided on HMI can include for example the following indications:

Switch status (open/close)

Disconnector status. (open/close in case of fixed switching device or switching device withdrawn/inserted in case of withdrawable switching device)

Earth switch status (open/close to earth)

IED ready status (availability and correct functionality of IED)

IED ready status indication (switching device position and actuator/drive readiness)

Other optional indications (Voltage presence indication, current amplitude)

Operation command buttons (close/open) for all the panel operable devices Each indication can be provided through a LED or other visible device that represents in a clear and not misunderstanding way a specific status among two or more.

Other sensors that can be optionally present within the switching device compartment generate signals that are connected to the I/O IED block. Examples of these sensors are temperature sensor(s) and gas density sensor(s).

Figure 6:
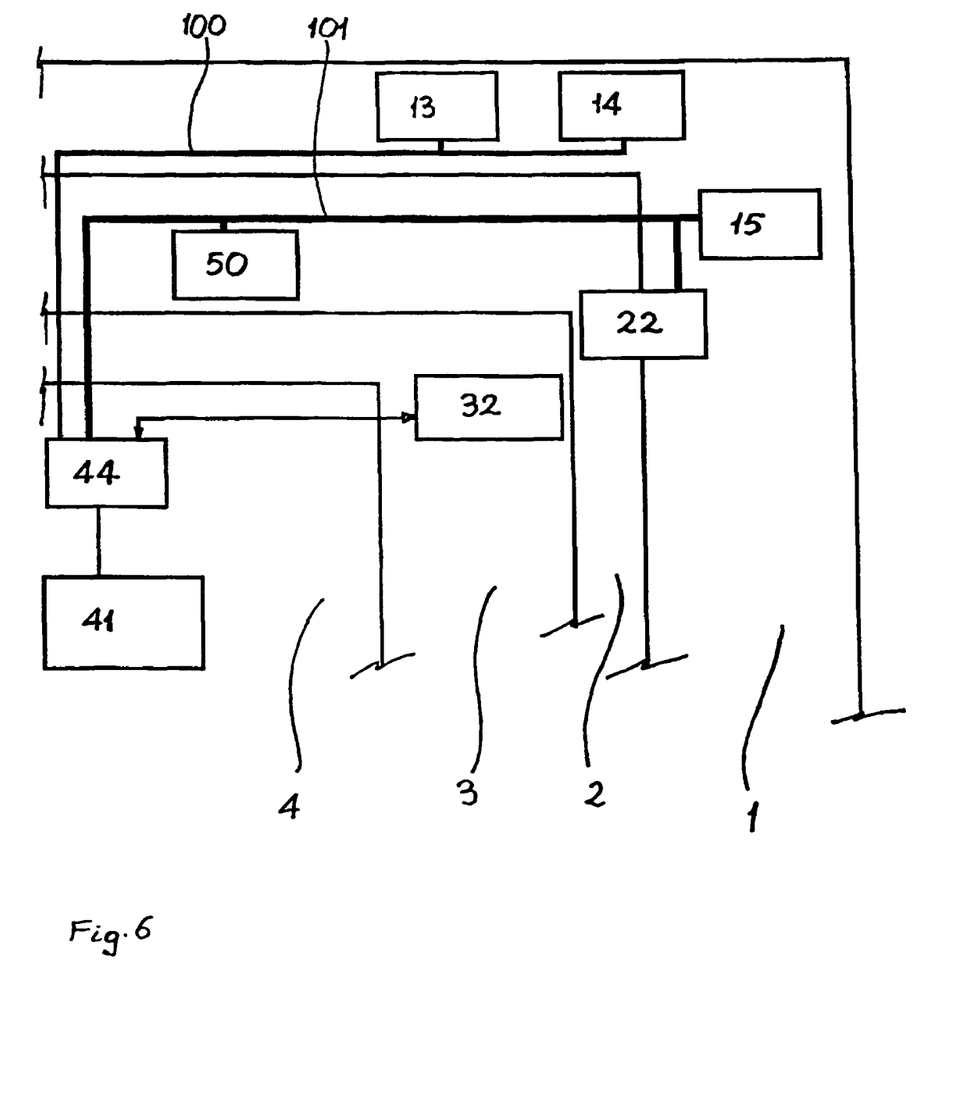
FIG. 6 illustrates an exemplary block diagram of the Communication section of the present invention.

With reference to FIG. 6, the communication section realizes the communication between the IED and intelligent units that are extern to the switching device compartment. Moreover it allows to receive and provide information from/to devices that are not foreseen to be connected to the IED I/O block in the standard solution but that can be added within the functional unit and coupled to the process communication system in an easy way, according to the specific network management rules of the process communication system.

The IED communication block allows the IED to exchange (provide and receive) information on the functional unit with the rest of the functional unit and the switchboard, in particular with other IED's and optionally with a higher level of the system (station level control center or remote control center). The block manages also the communication protocol(s).

The process communication system conveys information on the single functional unit and to/from others functional units. It allows the interconnection of intelligent devices in a flexible and configurable way: it is possible to modify the number and type of devices on the communication system and/or to modify information exchanged among them simply reconfiguring/programming them and the IED communication block, without any redesign of the hardware and with very little impact on the layout of the system.

Information shared on this communication system is aimed at several functionality, i.e. interlocking functions, automation sequences management, synchronization functionality, non-critical analogue measurement (optional). There can be several blocks connected to the process communication system: an intelligent terminal block can be present within the functional unit or at switchboard level that receives information on the functional unit through the process communication system and convert it into the required terminal block signals (contacts) available externally. Thanks to flexibility and configurability of the communication system the signals available on the terminal block are configurable via a specific software.

Any other IED within a functional unit of the same switchboard can receive information on the functional unit and/or send information on its functional unit through the process communication system. Due to communication system flexibility/configurability a new functional unit, equipped as described in the invention, can be easily added to the switchboard and connected to the communication system just reprogramming the communicated information and the relevant functions that use it within the IEDs involved.

Other optional intelligent device providing input to the IED can be connected to the process communication system, e.g. non critical analogue measurements.

The local configuration point allows a human operator with a suitable computer to communicate with the IED control unit through the local communication channel. Several functionality can be performed through it, for example the configuration of the IED functions (optional functions, parameters within functions, communication, . . . ), the update of the software, the uploading of information recorded on the IED, the configuration of the I/O transmitted to any block. Communication is possible only while the computer is connected to the local communication point.

A station communication system is optionally present to allow monitoring, supervising and remote control of the whole switchboard. Also this system is flexible and configurable via software when a new device is added to it. For example on this communication system there can be a switchboard level or station level HMI that makes available to an operator any information available in the IED, information received by HMI is configurable via software on the IED and can include, for example, switching device status, disconnector status, voltage and current measures, IED status.

A station operator computer can also be present on the station communication system and perform the same configuration functionality available through the local communication point to any functional unit linked to the station communication system.

The invention claimed is:

1. An integrated Medium Voltage switchboard, comprising a functional unit that further comprises:

a switching device compartment;

a switching device;

a power supply section;

an I/O section;

an Intelligent Electronic Device; and a communication section, wherein the Intelligent Electronic Device is physically located in said switching device compartment, on-board said switching device;

wherein said Intelligent Electronic Device performs monitor, protection and control activities of said functional unit;

wherein said Intelligent Electronic Device collects, concentrates and manages all information from different parts of said functional unit;

wherein said Intelligent Electronic Device comprises at least:

a control unit;

a I/O functional block, which realizes the conditioning and conversion of signals exchanged between said control unit and the rest of said functional unit;

a power supply block, which realizes the conditioning and adaption of power supply received from the rest of the power supply section of said functional unit;

a power drive block, which manages the energy supply of an actuator of said switching device; and         a communications block, which allows the Intelligent Electronic Device to exchange information with the rest of said functional unit and of said switchboard.

2. An integrated Medium Voltage switchboard according to claim 1, wherein said Intelligent Electronic Device comprises a Human Machine Interface block forming a Human Machine Interface for said functional unit.

3. An integrated Medium Voltage switchboard according to claim 2, wherein said Human Machine Interface block is located on a cover of said switching device compartment.

4. An integrated Medium Voltage switchboard according to claim 1, wherein said power supply section comprises a self supply unit.

5. An integrated Medium Voltage switchboard according to claim 1, wherein said power supply section comprises an auxiliary supply unit.

6. An integrated Medium Voltage switchboard according to claim 1, wherein said I/O section comprises voltage and current sensors on-board said switching device.

7. An integrated Medium Voltage switchboard according to claim 1, wherein said communication section comprises a station communication system.

* * * * *